United States Patent [19]

Lee

[11] Patent Number: 5,327,412
[45] Date of Patent: Jul. 5, 1994

[54] CONTINUOUS PLAYING APPARATUS FOR USE IN DISC PLAYER

[75] Inventor: Chung G. Lee, Suweon, Rep. of Korea

[73] Assignee: SamSung Electronics Co., Ltd., Suwon, Rep. of Korea

[21] Appl. No.: 767,641

[22] Filed: Sep. 30, 1991

[30] Foreign Application Priority Data

Nov. 12, 1990 [KR] Rep. of Korea ............... 90-18262

[51] Int. Cl.⁵ .................................... G11B 17/08
[52] U.S. Cl. ........................ 369/75.2; 369/178; 369/201
[58] Field of Search ............... 369/75.2, 34, 36, 178, 369/181, 183, 192, 194, 196, 201

[56] References Cited

U.S. PATENT DOCUMENTS 4,797,865 1/1989 Imai et al. ..................... 369/36
5,226,032 7/1993 Ikado et al. .................... 369/178

FOREIGN PATENT DOCUMENTS

63-102062 5/1986 Japan.
64-35560 3/1989 Japan.

*Primary Examiner*—Paul M. Dzierzynski
*Assistant Examiner*—Don Wong
*Attorney, Agent, or Firm*—Robert E. Bushnell

[57] ABSTRACT

A continuous playing apparatus for a disc player the apparatus includes a horizontal moving means and a lifting/lowering means. The horizontal moving means moves cartridges alternately and horizontally, and the lifting/lowering means loads and unloads discs to and from a turn table. The turn table is installed together with a pick-up unit on a deck. According to the present invention, continuous playings can be performed without discontinuity.

13 Claims, 7 Drawing Sheets

CONTINUOUS PLAYING APPARATUS FOR USE IN DISC PLAYER

FIELD OF THE INVENTION

The present invention relates to a continuous playing apparatus for use in a disc player, and particularly to an apparatus in which a compact disc can be replaced while playing another compact disc without discontinuity, thereby making it possible to perform continuous plays.

BACKGROUND OF THE INVENTION

In the conventional apparatuses, there are some which make it possible to play a plurality of discs continuously, and one of these apparatuses is disclosed in Japanese Patent No. Sho-63-102062. That is, in this apparatus, a plurality of information recording media such as compact discs and the like are loaded in parallel in a playing apparatus, in such a manner that continuous regenerations should be possible. This apparatus includes a plurality of disc driving means installed in parallel on the upper portion of the apparatus in such a manner as to drive a plurality of information recording media, and an optical pick-up section for sequentially regenerating the recorded signals of the information recording media by moving between plurality of the disc driving means to continuously regenerate the contents of the discs.

Another of such apparatuses is disclosed in Japanese Patent No. Sho-64-35560. In this apparatus, two discs are loaded on a turn table, and then, one of the discs is selectively detached to make it unplayable, so that the other disc can be played. This apparatus includes a turn table for setting one of two discs to be playable, a tray for withdrawing one of the discs upwardly to keep the withdrawn disc in an unplayable condition, and an optical pick-up installed to be freely slidable toward the playing disc, so as to continuously play discs.

However, in the above described conventional disc players, a disc can not be replaced during the play of a disc, and a continuous play is impossible during the replacement of a disc. Further, their structures are very complicated, with the result that manufacturing becomes difficult and expensive.

Further, their complicated structures result in loss of accuracy after time, so that even a slight impact or vibration can cause a problem.

SUMMARY OF THE INVENTION

It is an object of the invention to provide a continuous playing apparatus for use in a disc player, in which a plurality of discs can be played continuously, and one disc can be replaced even during the playing of another disc.

The present invention includes a moving means for horizontally and alternately moving cartridges loaded with discs and placed on an upper or lower part of an upper portion of a housing of a disc player, and a lifting/lowering means within the housing to load and unload discs to and from a turn table, with the turn table and a pick-up unit being installed on a deck, thereby making it possible to continuously play discs.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
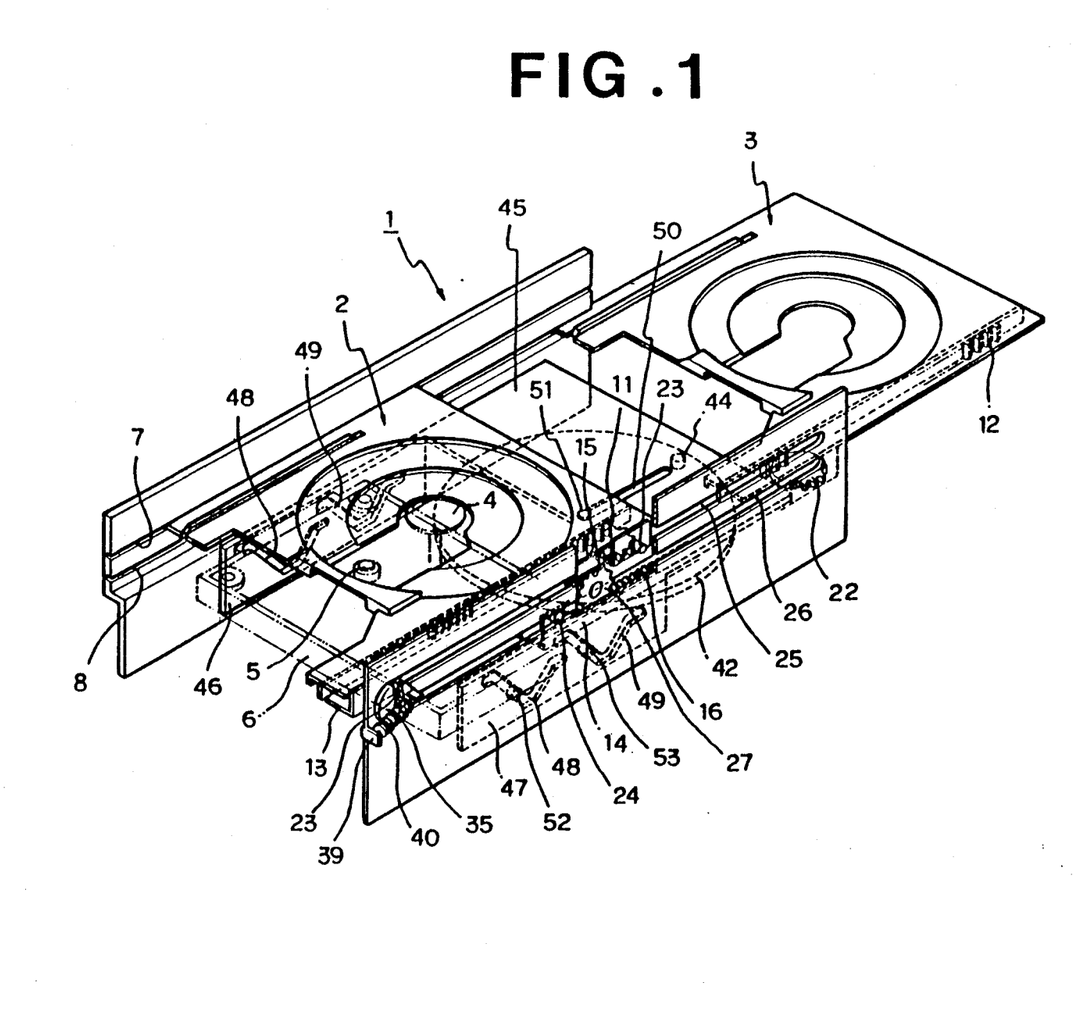
FIG. 1 is a schematical perspective view of the critical portions of the disc player according to the present invention.
Figure 3:
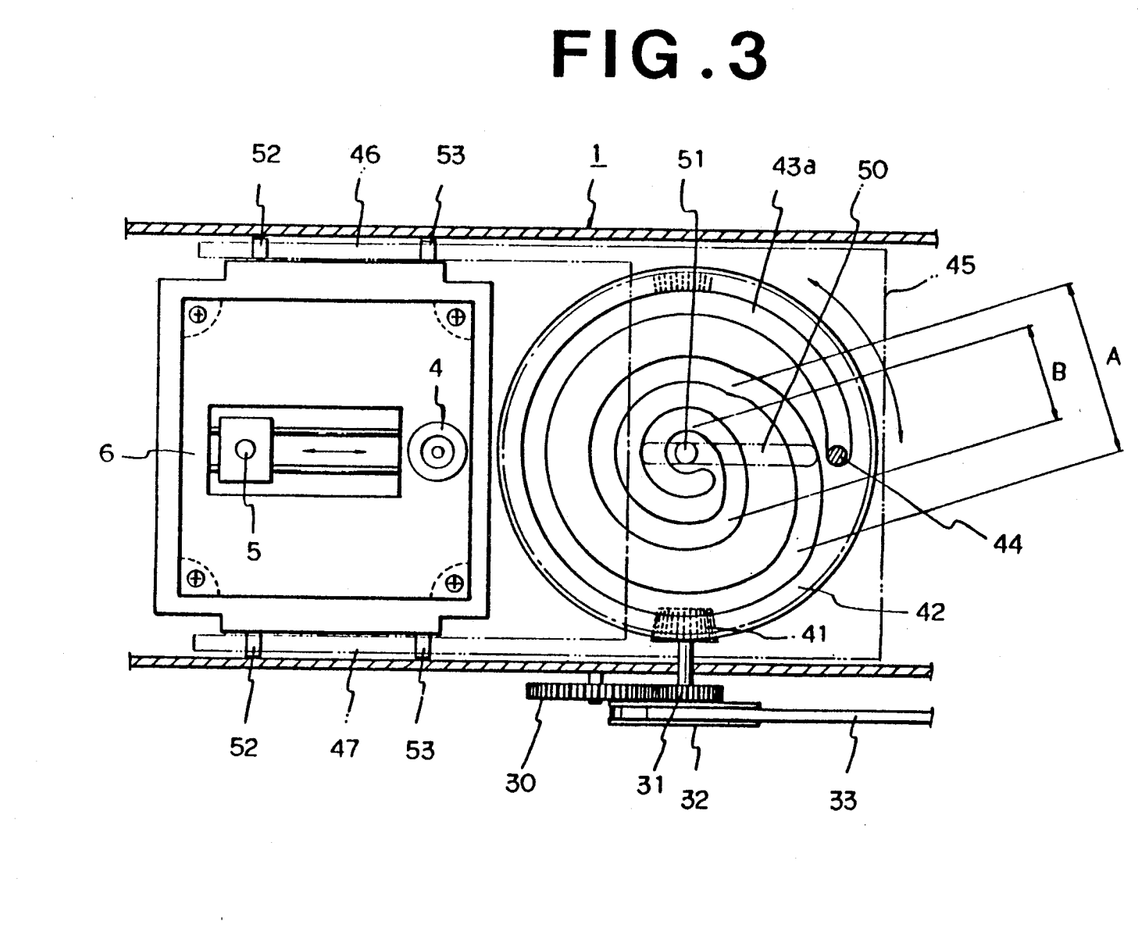
FIG. 3 illustrates the actuations of the deck of the present invention, with the turn table and the pick-up unit being installed thereon.

FIG. 1 is a perspective view schematically showing a part of the continuous playing apparatus of the disc player according to the present invention. As shown in this drawing, cartridges 2,3 are installed up and below in the upper portion of a housing 1 of the disc player, and either one of these cartridges 2,3 can be moved horizontally by a horizontal moving means. Further, a pick-up unit 5 and a turn table 4 are installed on a deck 6, and this deck 6 can be moved up and down by means of a lifting/lowering means as shown in FIG. 3. Thus, discs can be loaded and unloaded to and from the turn table 4, so that discs can be continuously played.

First the horizontal moving means for moving the cartridges 2,3 in the horizontal direction will be described. Guide grooves 7,8 are formed on an upper and lower part of the upper portions of the inner side walls of the housing 1, and fitted into these guide grooves 7, 8 are the cartridges 2,3 on which discs are placed. A first rack 9 and a second rack 10 are formed on one of the side walls of the housing 1. Further, third and fourth racks 11,12 are formed on one of the sides of the cartridges 2,3, while sliding brackets 13,14 are formed below them in a mutually facing form.

Fifth and sixth racks 15, 16 are formed on the sides of the upper and lower brackets 13,14, and guide slots 17,18 are formed on the sides of the fifth and sixth racks 15,16, while guide plates 19,20 are inserted into the guides slots in such a manner as to be fixed to the cartridges 2,3. Further, guiding rotating gears 21,22 are rotatably installed at leading ends of the sliding brackets 13,14, in such a manner that they are moved by being engaged with the first and second racks 9,10. Further, the gears 21,22 can also be moved by being engaged with the third and fourth racks 11,12 which are formed on the side walls of the cartridges 2,3.

Guide shafts 23,24 project from opposite sides of the upper and lower brackets 13,14, while first and second guide slots 25,26 are formed on the side walls of the housing 1 in such a manner that they can be coupled with the shafts 23,24. Further, a pinion 27 is rotatably engaged with the fifth and sixth racks 15,16 of the brackets 13,14.

A first rotating gear 28 is installed on a same shaft as the pinion 27, and the first rotating gear 28 is engaged with a second rotating gear 29, while the second rotating gear 29 is engaged with a third rotating gear 30. Further, the third rotating gear 30 is engaged with a fourth rotating gear 31, and a pulley 32 is installed on the same shaft as that of the fourth rotating gear 31, while a driving pulley 34 is installed near the pulley 32, the driving pulley 34 being connected through a belt 33 to the pulley 32.

Figure 7:
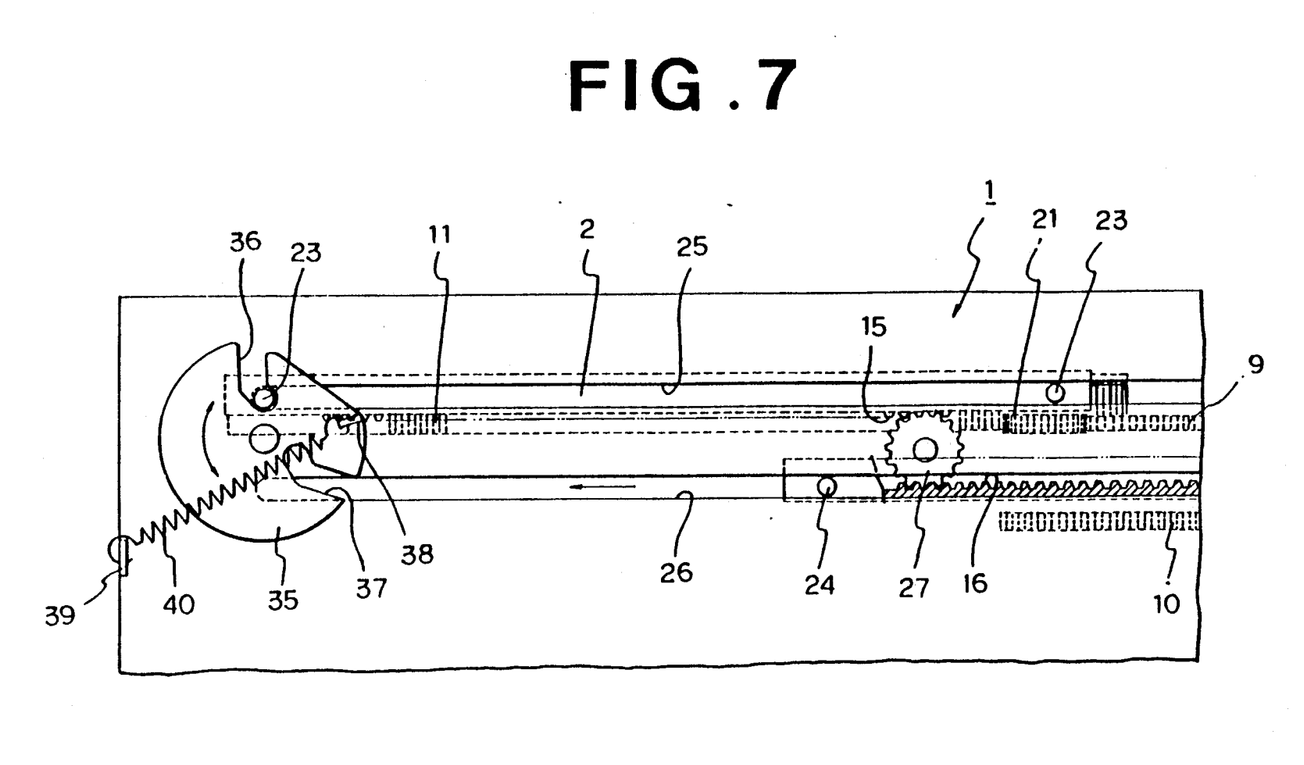
FIG. 7 illustrates the actuations of the rotating change plate according to the present invention.

Meanwhile, a rotating change plate 35 is installed at the outside of the housing 1, at leading ends of the upper and lower cartridges 2,3, and the plate 35 is provided with first and second insertion slots 36,37 as shown in FIG. 7.

Figure 4:
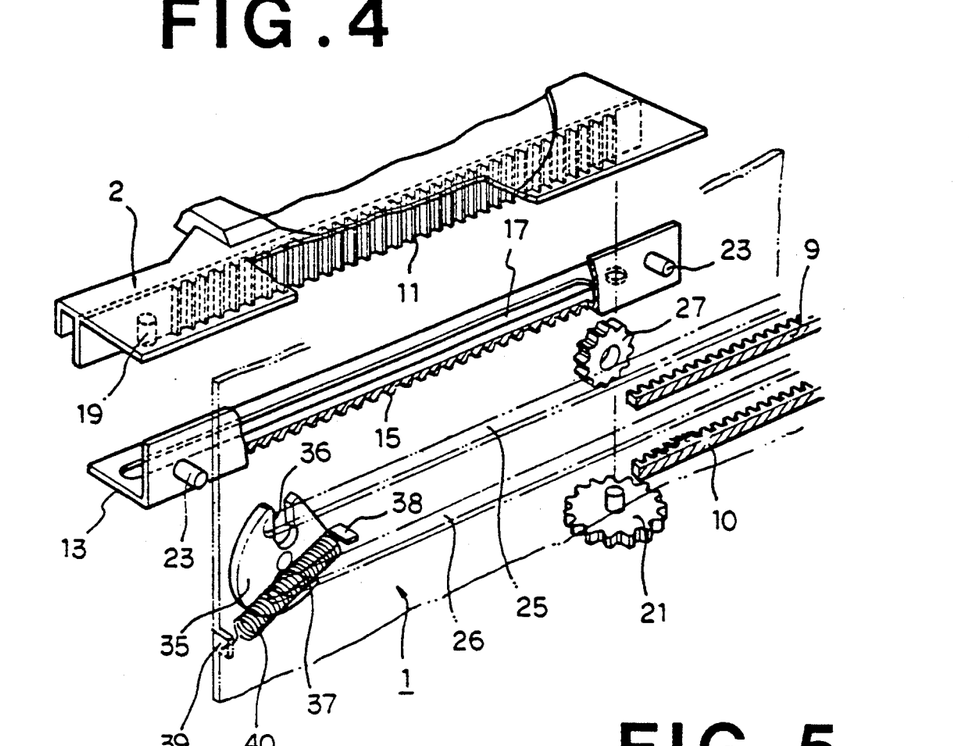
FIG. 4 is an exploded perspective view schematically showing the critical portions of the apparatus of the present invention.

As shown in FIG. 4, the housing 1 and the rotating plate 35 are respectively provided with spring securing protuberances 38,39 on which a tension spring 40 is elastically installed.

Now the lifting/lowering means for lifting and lowering the deck 6 (on which the turn table 4 and the pick-up unit 5 are installed) will be described.

Figure 5:
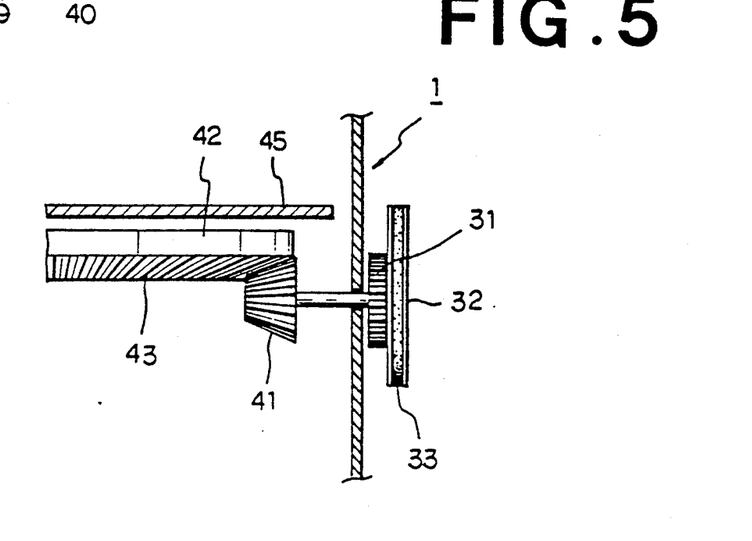
FIG. 5 is an enlarged exploded sectional view showing the power transmitting section according to the present invention.
Figure 6:
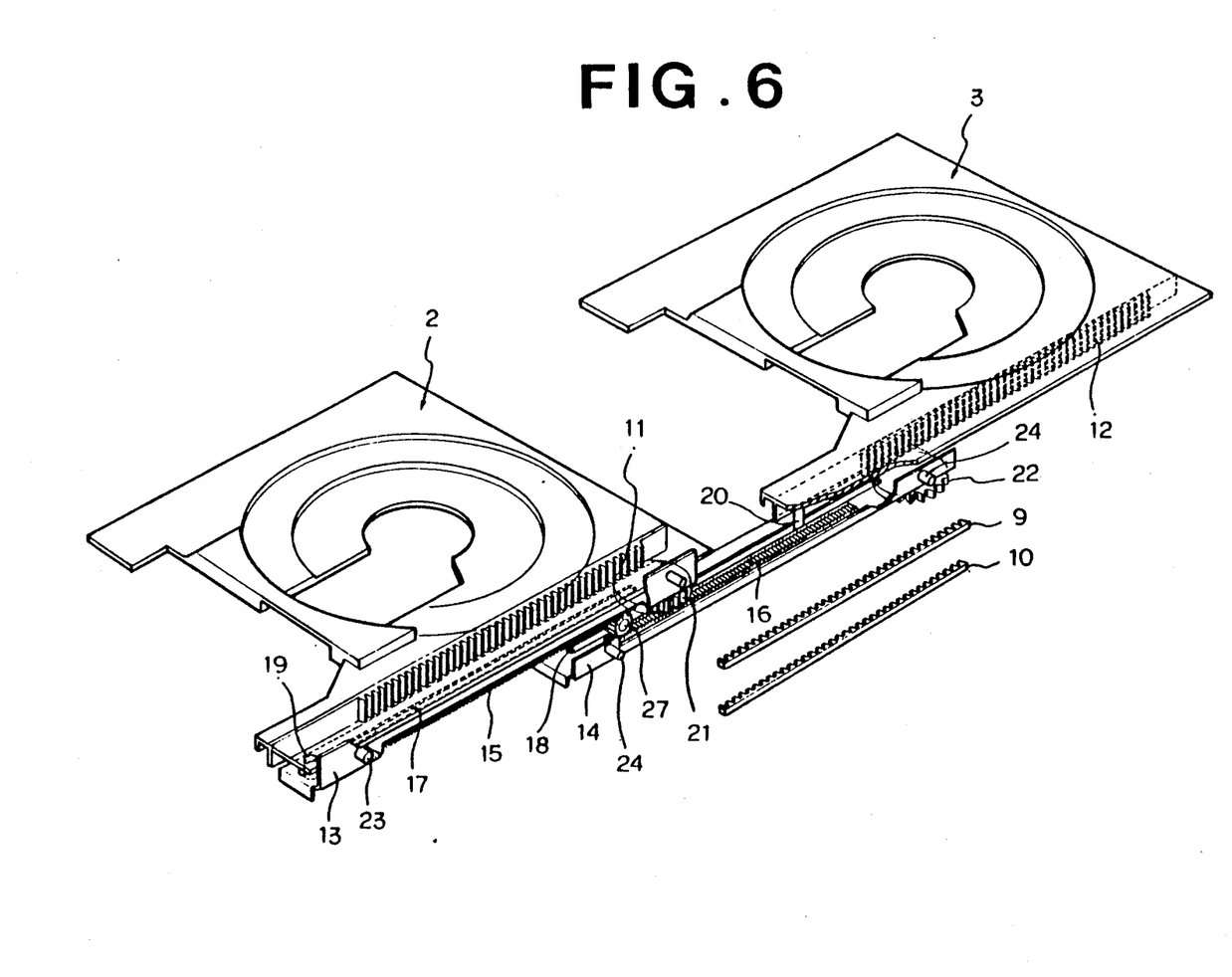
FIG. 6 is a perspective view showing the coupled cartridge excluding the housing of the present invention.

As shown in FIG. 5, a rotating gear 41 having a frustoconical shape is installed on the same shaft as that of the fourth rotating gear 31, and a cam gear 42 is installed rotatably by being engaged with the rotating gear 41, while under the cam gear 42, is a bevel gear 43 being engaged with the rotating bevel gear 41.

Meanwhile, a cam groove 43a is formed on the upper face of the cam gear 42 as shown in FIG. 3, and a cam pin 44 is inserted into the cam groove 43a so the cam pin can move along the cam groove.

A guide chassis 45 is installed within the housing 1, and side plates 46,47 are formed on a side thereof, while the side plates 46,47 are provided with loading slots 48,49. Meanwhile, the cam pin 44 is secured to one of the side plates 46,47, and a straight guide slot 50 is formed near the cam pin 44. A guide shaft 51 is projected from the center of an upper face of the cam gear 42, to be inserted into the guide slot 50.

The deck 6 on which the pick-up unit 5 and the turn table 4 are installed is accommodated within the housing 1, and guide pins 52,53 project from opposite sides of the deck 6, so that the guide pins 52,53 can be inserted into the loading slots 48,49 of the side plates 46,47.

The present invention constituted as above will now be described as to its operation and effect.

Figure 2A:
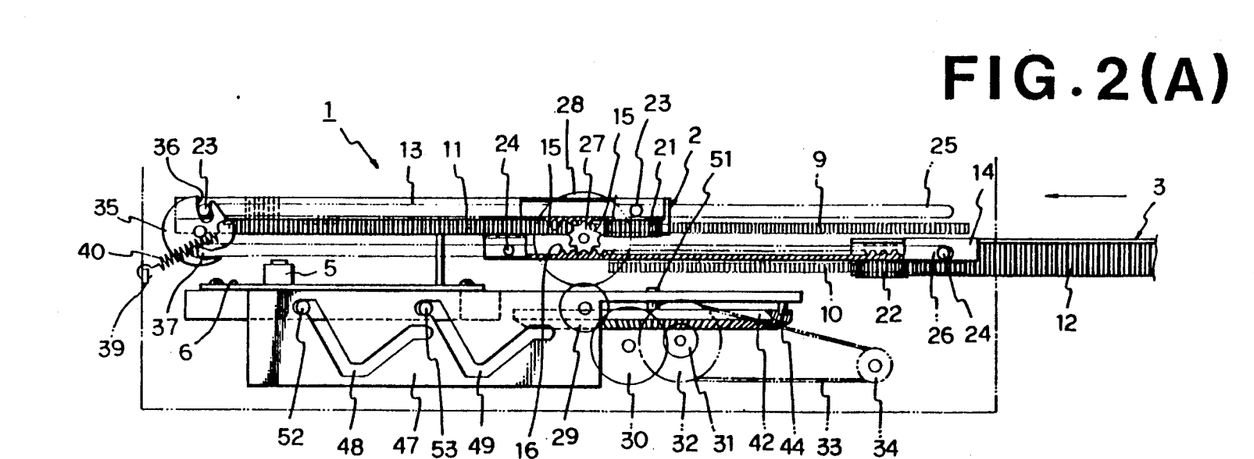
FIGS. 2A, 2B and 2C illustrate the operations of the disc player according to the present invention.

First, the operation of continuously playing the lower disc succeeding the playing of the upper disc will be described referring to FIG. 2A. If the driving pulley 34 which is connected to the shaft of a driving motor (not shown) is driven, then the pulley 32 which is connected through the belt 33 to the driving pulley 34 is rotated. When the pulley 32 rotates, the fourth rotating gear 31 is rotated, and when the fourth rotating gear 31 rotates, the third rotating gear 30 is rotated. Further, when the third rotating gear 30 rotates, the second rotating gear 29 is rotated, and when the second rotating gear 29 rotates, the first rotating gear 28 is rotated. When the first rotating gear 28 rotates, the pinion 27 which is installed concentrically with the first rotating gear 28 is rotated.

When the pinion 27 rotates, the sixth rack 16 of the lower bracket 14, which is engaged with the pinion 27, receives driving power. The lower bracket 14 is thus driven into the housing 1. Under this condition, the guiding rotating gear 22 which is installed on the bracket 14, is engaged with the second rack 10 which is formed on the inner side wall of the housing 1 and therefore, the rotating gear 22 rotates along the second rack 10.

Further under this condition, the fourth rack 12 of the lower cartridge 3 is engaged with the rotating gear 22, and the lower cartridge 3 is moved into the housing 1.

However, when the cartridge 3 is moved, the diameter of the rotating gear 22 is larger than that of the pinion 27, so when the bracket 14 is inserted completely into the housing 1, the cartridge 3 is also inserted completely into the housing 1, so that the cartridge 3 is evenly overlapped with the bracket 3.

When the cartridge 3 is moved under the above mentioned condition, the guide pin 20 which is installed on the cartridge 3 is guided along the guide slot 18 of the bracket 14.

Figure 2B:
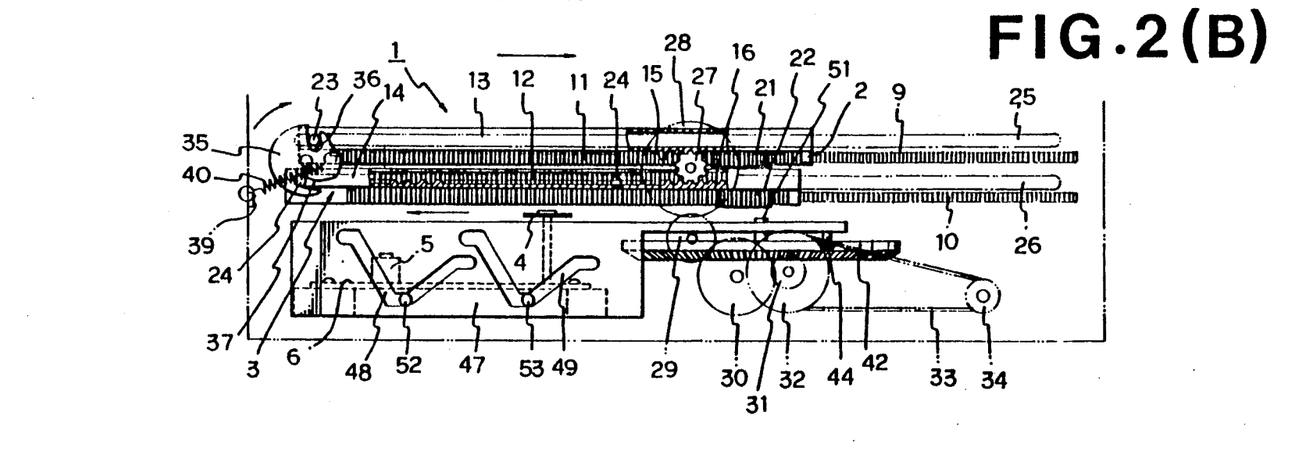

As shown in FIG. 2B, when the lower cartridge 3 is inserted, the guide shaft 24 of the bracket 14 is inserted into the second insertion slot 37 of the rotating change plate 35, thereby driving the plate 35 in the direction of the arrow mark. Under this condition, the guide shaft 23 of the upper bracket 13, which is inserted into the first insertion slot 36, is pushed out, thereby moving the upper bracket 13.

Figure 2C:
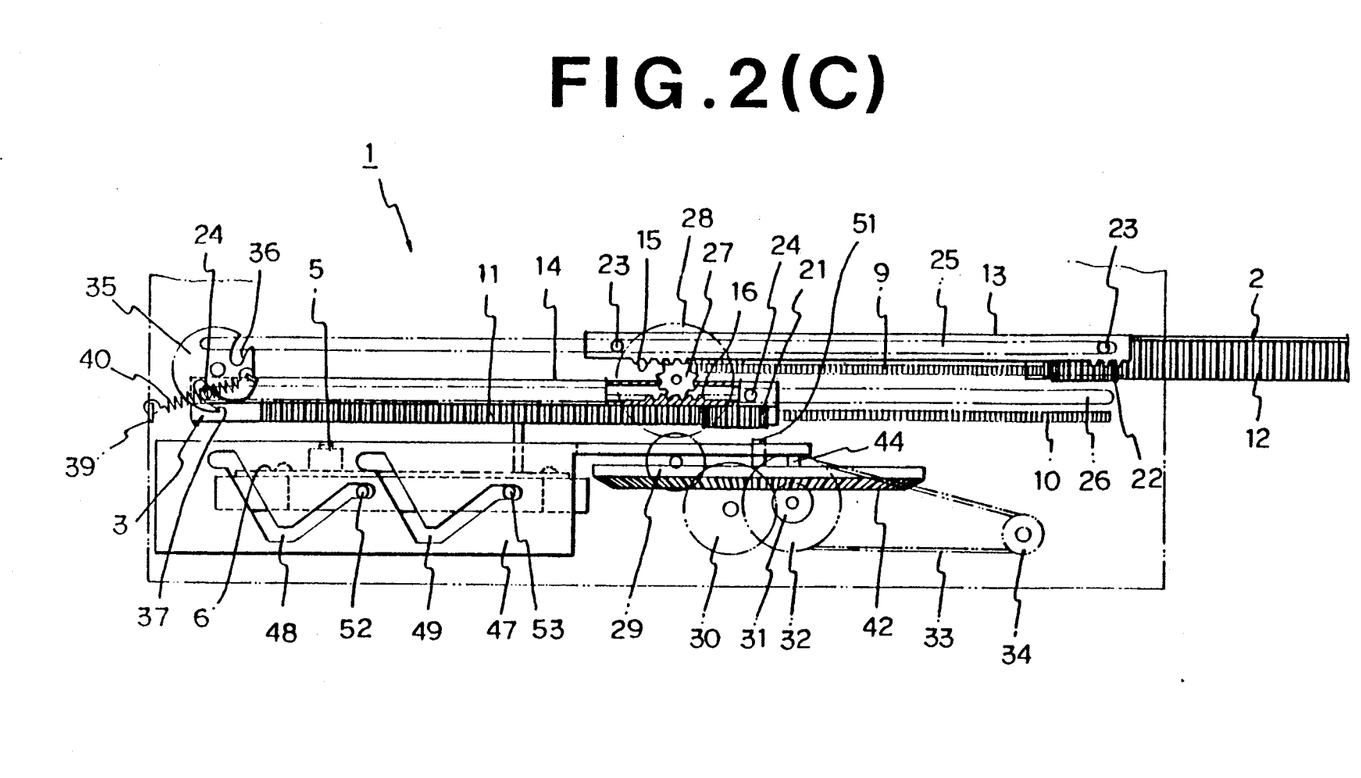

When the bracket 13 is moved, the fifth rack 15 which is formed on the lower portion of the bracket 13, is engaged with the pinion 27. Under this condition, the pinion 27 continuously rotates, thus the upper cartridge 2 is pushed to the outside of the housing 1 as shown in FIG. 2C.

The movement of the cartridge 3 to the outside of the housing 1 is done based on a procedure reverse to that of inserting the cartridge 3, thus a detailed description is not necessary.

If a new lower cartridge 3 is inserted under the above mentioned condition, the disc on cartridge 3 is loaded to the turn table 4 by the lifting/lowering means, so that the disc can be played as hereinafter described.

When the lower cartridge 3 is inserted into the housing 1, the cam gear 42 turns, being engaged with the conical rotating gear 41 which is installed concentrically with the fourth rotating gear 31.

When the cam gear 42 rotates, the cam pin 44 is guided along the cam groove 43a, and as shown in FIG. 3, when the cam pin 44 enters into a segment A, the cam pin 44 and guide chassis 45 are guided leftwardly from that point, because the cam pin 44 is secured integrally with the guide chassis 45. When the guide chassis 45 is guided, the side plates 46,47 of the guide chassis 45 move together with it, and the loading slots 48,49 which are formed on the guide chassis 45 also move together. Accordingly, the guide pins 52,53 of the deck 6 are guided downwardly along the loading slots 48,49, being inserted therein.

Thus the apparatus as shown in FIG. 2B corresponds to the guide pins 52,53 being located at an innermost position of the segment A.

Thus the deck 6 is lowered, and the turn table 4 is detached from the disc.

In the above condition, the upper cartridge 2 exits to the outside of the housing 1, while the lower cartridge 3 enters into the housing 1.

If the cam gear 42 rotates further, and if the cam pin 44 enters into a segment B of the cam groove 43a, then the guide chassis 45 is further guided leftwardly, while the guide pins 52,53 begin to rise along the loading slots 48,49. When the guide pins 52,53 completely rise in the loading slots 48,49 to the positions shown in FIG. 2(A) then the turn table 4 is loaded with a new disc. Under this condition, the pick-up unit 5 and the turn table 4 are driven to carry out playing.

In the above described operation, when the guide pins 52,53 are guided along the loading slots 48,49, the deck 6 should not move laterally when the deck 6 is moving up or down. Therefore, a guiding means is provided on the housing 1 to ensure that the deck 6 will not move laterally while moving up and down.

As described above, according to the present invention, the housing 1 of the disc player is provided with a horizontal moving means (for moving the cartridges 2,3), and a lifting/lowering means for lifting and lowering the deck 6. The horizontal moving means allows discs to enter and exit the housing, while the lifting/lowering means moves the deck 6 up and down. This makes is possible to load discs on the turn table 4 and to play the discs continuously, and assures accurate operations as well as minimizing problems due to simplification of the device.

The present invention is not limited to the embodiment described hereinabove. Various modifications of the invention will become apparent to persons skilled in the art upon reference to the claims and the above description of the invention. The claims pertain to all modifications and embodiments which fall within the scope of the invention.

What is claimed is:

1. A continuous playing apparatus in a disc player for playing a first and a second disc, comprising:
   a housing;
   first and second cartridges having first and second gears, for seating the first and second discs;
   horizontal moving means alternately engaging said first and second gears, for horizontally and alternately moving said first and second cartridges, said first and second cartridges being spaced horizontally apart from each other and movably mounted on a first side of an upper portion of said housing so as to insert and eject the first and second discs to and from said housing, respectively;
   a deck with a turntable and a pickup means mounted on the deck; and
   lifting and lowering means for lifting and lowering said deck towards and away from the first and second cartridges;
   said deck loading and unloading the first and second discs on the turntable and said pickup means being mounted so as to play the first and second discs continuously.

2. The continuous playing apparatus as claimed in claim 1, wherein said horizontal moving means comprises:
   first and second racks horizontally formed on an inner side wall of said housing;
   said first and second gears being comprised of third and fourth racks formed on one side of said first and second cartridges, respectively;
   rotating gears engaged between said first and second racks of said housing and said third and fourth racks of said cartridges, respectively;
   first and second brackets having a fifth rack and a sixth rack, respectively, said first and second brackets provided on one side of said first and second cartridges, respectively;
   a pinion gear;
   power transmission means to continuously rotate said pinion gear to guide said brackets horizontally, said pinion gear alternately engaging said fifth rack and said sixth rack;
   a guiding rotating gear mounted on said second bracket for engaging said fourth rack of said second cartridge, to move said second cartridge horizontally when said second bracket is moved horizontally;
   a rotating plate rotatably and elastically mounted on a second side of said upper portion of said housing, for receiving a first protuberance of one of said first and second cartridges, and for ejecting a second protuberance of the other one of said first and second cartridges upon receiving said first protuberance.

3. The continuous playing apparatus as claimed in claim 1, wherein said lifting/lowering means comprises:
   a cam gear rotatably mounted within said housing;
   a guide chassis to be guided in a first and a second direction according to the revolutions of said cam gear;
   side plates formed on opposite sides to said guide chassis and provided with loading slots; and
   guide pins projected from said deck to be inserted into said loading slots so as to move said deck down.

4. A continuous playing apparatus in a disc player for playing a first and a second disc, comprising:
   a housing;
   an upper cartridge for receiving the first disc placed by a user;
   a lower cartridge for receiving the second disc placed by a user;
   horizontal moving means for horizontally moving said upper cartridge between an upper deck position and an upper user position and for horizontally moving said lower cartridge between a lower deck position and a lower user position; and
   vertical moving means for vertically moving a deck which comprises:
      a pick-up unit to retrieve information from a playing disc being one of the first disc on the upper cartridge and the second disc on the lower cartridge, and
      a turntable to rotate said playing disc;
   said horizontal moving means simultaneously moving said upper and lower cartridges during a portion of the horizontal movement of each of said upper and lower cartridges;
   said vertical moving means moving said deck in response to the horizontal movement of said upper and lower cartridges for enabling a non-playing disc to become the playing disc and for enabling said pick-up unit to continuously retrieve information from said first and second discs.

5. The apparatus of claim 4, wherein said horizontal moving means comprises rack and pinion means connected to the upper and lower cartridges, for horizontally moving the cartridges when driven.

6. The apparatus of claim 4, wherein said horizontal moving means comprises:
   a first guide groove formed on a first inner wall of the housing to slidably support one side of the upper cartridge;
   a second guide groove formed on the first inner wall of the housing to slidably support one side of the lower cartridge;

first and second racks horizontally formed on a second inner wall of the housing opposite said first inner wall;
a third rack formed on a second side of the upper cartridge;
a fourth rack formed on a second side of the lower cartridge;
a first bracket having a first guiding rotating gear engaging said third rack and a fifth rack;
a second bracket having a second guiding rotating gear engaging said fourth rack and a sixth rack;
gears when driven to selectively drive one of the fifth rack to horizontally move said first bracket, in turn, horizontally moving the upper cartridge between the upper deck position and the upper user position, and the sixth rack to horizontally move said second bracket, in turn, horizontally moving the lower cartridge between the lower deck position and the lower user position.

7. The apparatus of claim 4, wherein the vertical moving means comprises:
a cam gear rotatably mounted within said housing;
a guide chassis to be guided in dependence upon the cam gear;
side plates provided with loading slots formed on opposite sides of the guide chassis; and
guide pins projected from said deck to be inserted into said loading slots to vertically move the deck upon movement of the cam gear.

8. A continuous playing apparatus for use in a disc player, comprising:
horizontal moving means for horizontally moving one of an upper cartridge between an upper deck position and an upper user position and a lower cartridge between a lower deck position and a lower user position; and
vertical moving means for vertically moving a deck comprising a pick-up unit for retrieving information from a playing disc located on the deck and a turntable for rotating said playing disc, wherein a non-playing disc is one of an upper disc on the upper cartridge and a lower disc on the lower cartridge and said playing disc is one of said upper and lower discs provided from one of said upper and lower cartridges;
said horizontal moving means simultaneously moving said upper cartridge and said lower cartridge during a portion of the horizontal movement of each of said upper and lower cartridges;
said vertical moving means, responding to the horizontal moving means, for transferring the non-playing disc to the deck to become the playing disc and for enabling said pick-up unit to continuously retrieve information throughout the transfer by transferring the playing disc from the deck to one of the upper and lower cartridges and immediately thereafter transferring the non-playing disc to the deck while the pick-up unit continues to retrieve information from the playing disc on the deck throughout the transfer.

9. A disc player comprising:
a housing;
an upper cartridge supported by the housing to hold an upper disc;
a lower cartridge supported by the housing to hold a lower disc;
a first guide groove formed on a first inner wall of the housing to slidably support one side of the upper cartridge;
a second guide groove formed on the first inner wall of the housing to slidably support one side of the lower cartridge;
first and second racks horizontally formed on a second inner wall of the housing opposite from said first inner wall;
a third rack formed on a second side of the upper cartridge;
a fourth rack formed on a second side of the lower cartridge;
a first bracket having a first guiding rotating gear engaging said third rack and a fifth rack;
a second bracket having a second guiding rotating gear engaging said fourth rack and a sixth rack;
gears when driven to selectively drive one of the fifth rack to horizontally move said first bracket for horizontally moving the upper cartridge between an upper deck position and an upper user position, and the sixth rack to horizontally move said second bracket for horizontally moving the lower cartridge between a lower deck position and a lower user position;
a deck comprising a pick-up unit to retrieve information from a playing disc on the deck and a turntable to rotate said playing disc;
a cam gear rotatably mounted within said housing;
a guide chassis to be guided in dependence upon the cam gear;
side plates provided with loading slots formed on opposite sides of the guide chassis; and
guide pins projected from said deck to be inserted into said loading slots to vertically move the deck upon movement of the cam gear to provide transferring of the playing disc from the deck to one of the upper and lower cartridges and immediately thereafter transferring a non-playing disc from an other one of the upper and lower cartridges to the deck, and to provide the pick-up unit to continuously retrieve information throughout the transfer.

10. A continuous playing apparatus in a disc player for playing a first and a second disc, comprising:
a housing;
first and second cartridges having first and second gears, for seating the first and second discs;
horizontal moving means alternately engaging said first and second gears, for horizontally and alternately moving said first and second cartridges, said first and second cartridges being spaced horizontally apart from each other and movably mounted on a first side of an upper portion of said housing so as to insert and eject the first and second discs to and from said housing, respectively, said horizontal moving means comprising:
first and second racks horizontally formed on an inner side wall of said housing,
said first and second gears being comprised of third and fourth racks formed on one side of said first and second cartridges, respectively,
rotating gears engaged between said first and second racks of said housing and said third and fourth racks of said cartridges, respectively,
first and second brackets having a fifth rack and a sixth rack, respectively, said first and second brackets provided on one side of said first and second cartridges, respectively, a pinion gear, power transmission means to continuously rotate said pinion gear to guide said brackets horizontally, said pinion gear alternately engaging said fifth rack and said sixth rack, a guiding rotating gear mounted on said second bracket for engaging said fourth rack of said second cartridge, to move said second cartridge horizontally when said second bracket is moved horizontally, and a rotating plate rotatably and elastically mounted on a second side of said upper portion of said housing, for receiving a first protuberance of one of said first and second cartridges, and for ejecting a second protuberance of the other one of said first and second cartridges upon receiving said first protuberance;

a deck with a turntable and a pickup means mounted on the deck; and lifting and lowering means for moving said deck parallel to an axes of rotation of said rotating gears;

said deck loading and unloading the first and second discs on the turntable and said pickup means being mounted so as to play the first and second discs continuously.

11. The continuous playing apparatus as claimed in claim 10, further comprising said lifting and lowering means being comprised of:

a cam gear rotatably mounted within said housing;

a guide chassis to be guided in a first and a second direction according to the revolutions of said cam gear;

side plates formed on opposite sides to said guide chassis and provided with loading slots; and guide pins projected from said deck to be inserted into said loading slots so as to move said deck down.

12. A continuous playing apparatus in a disc player for playing a first and a second disc, comprising:

a housing;

first and second cartridges having first and second gears, for seating the first and second discs;

horizontal moving means alternately engaging said first and second gears, for horizontally and alternately moving said first and second cartridges, said first and second cartridges being spaced horizontally apart from each other and movably mounted on a first side of an upper portion of said housing so as to insert and eject the first and second discs to and from said housing, respectively;

a deck with a turntable and a pickup means mounted on the deck, said deck loading and unloading the first and second discs on the turntable and said pickup means being mounted so as to play the first and second discs continuously; and means for lifting said deck towards the first and second cartridges and for lowering said deck and away from the first and second cartridges, said means for lifting and lowering said deck comprising:

a cam gear rotatably mounted within said housing, a guide chassis to be guided in a first and a second direction according to the revolutions of said cam gear, side plates formed on opposite sides to said guide chassis and provided with loading slots, and guide pins projected from said deck to be inserted into said loading slots so as to move said deck down.

13. The continuous playing apparatus as claimed in claim 12, further comprising said horizontal moving means being comprised of:

first and second racks horizontally formed on an inner side wall of said housing;

said first and second gears being comprised of third and fourth racks formed on one side of said first and second cartridges, respectively;

rotating gears engaged between said first and second racks of said housing and said third and fourth racks of said cartridges, respectively;

first and second brackets having a fifth rack and a sixth rack, respectively, said first and second brackets provided on one side of said first and second cartridges, respectively;

a pinion gear;

power transmission means to continuously rotate said pinion gear to guide said brackets horizontally, said pinion gear alternately engaging said fifth rack and said sixth rack;

a guiding rotating gear mounted on said second bracket for engaging said fourth rack of said second cartridge, to move said second cartridge horizontally when said second bracket is moved horizontally; and a rotating plate rotatably and elastically mounted on a second side of said upper portion of said housing, for receiving a first protuberance of one of said first and second cartridges, and for ejecting a second protuberance of the other one of said first and second cartridges upon receiving said first protuberance.

* * * * *